US007962273B2

(12) United States Patent
Caretta

(10) Patent No.: US 7,962,273 B2

(45) Date of Patent: Jun. 14, 2011

(54) ENGINE CONTROL AND METHOD FOR DETERMINING THE PRESSURE IN A COMBUSTION CHAMBER OF AN INTERNAL COMBUSTION ENGINE

(75) Inventor: Gianluca Caretta, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 407 days.

(21) Appl. No.: 12/280,054

(22) PCT Filed: Feb. 19, 2007

(86) PCT No.: PCT/EP2007/051565

§ 371 (c)(1), (2), (4) Date: Aug. 20, 2008

(87) PCT Pub. No.: WO2007/096331

PCT Pub. Date: Aug. 30, 2007

(65) Prior Publication Data

US 2009/0024298 A1 Jan. 22, 2009

(30) Foreign Application Priority Data

Feb. 21, 2006 (DE) ......................... 10 2006 008 062

(51) Int. Cl.
*G06F 19/00* (2006.01)
*F02M 7/00* (2006.01)

(52) U.S. Cl. ....................................... 701/102; 123/435

(58) Field of Classification Search .................. 701/102, 701/101; 123/435; 73/35.12, 705; 250/227.17
See application file for complete search history.

(56) References Cited

U.S. PATENT DOCUMENTS

| | | | | |
|---|---|---|---|---|
| 5,421,305 | A | 6/1995 | Tomisawa | 123/435 |
| 5,831,263 | A * | 11/1998 | Komachiya et al. | 250/227.17 |
| 6,843,231 | B1 * | 1/2005 | Duffy et al. | 123/435 |
| 6,873,930 | B2 | 3/2005 | Hirn | 702/142 |
| 2001/0002587 | A1 * | 6/2001 | Walter et al. | 123/90.15 |
| 2003/0167118 | A1 * | 9/2003 | Rizzoni et al. | 701/101 |

FOREIGN PATENT DOCUMENTS

| | | | |
|---|---|---|---|
| DE | 10 2005 009 914 | A1 | 10/2005 |
| EP | 0 652 425 | A2 | 10/1994 |
| EP | 1 400 671 | A2 | 3/2004 |
| WO | WO 02/093178 | A2 | 11/2002 |

* cited by examiner

*Primary Examiner* — Mahmoud Gimie
(74) *Attorney, Agent, or Firm* — King & Spalding L.L.P.

(57) ABSTRACT

In an engine control for an internal combustion engine (1) and in a method, a pressure signal (pA) reproducing the pressure (pA) in one of the combustion chambers (2A) is supplied to an evaluation unit (5) by a pressure signal sensor (4). The evaluation unit (5) uses the pressure signal (pA) to determine the pressure (pB, pC, pD) in at least one other combustion chamber (2B, 2C, 2D).

15 Claims, 4 Drawing Sheets

ENGINE CONTROL AND METHOD FOR DETERMINING THE PRESSURE IN A COMBUSTION CHAMBER OF AN INTERNAL COMBUSTION ENGINE

CROSS-REFERENCE TO RELATED APPLICATIONS

This application is a U.S. national stage application of International Application No. PCT/EP2007/051565 filed Feb. 19, 2007, which designates the United States of America, and claims priority to German application number 10 2006 008 062.9 filed Feb. 21, 2006, the contents of which are hereby incorporated by reference in their entirety.

TECHNICAL FIELD

The invention relates to an engine control and a method for determining the pressure in a combustion chamber of an internal combustion engine.

BACKGROUND

To improve combustion of the mixture introduced into a combustion chamber of an internal combustion engine, numerous devices and methods have been proposed in recent years, permitting a more environmentally compatible combustion of the mixture, it being known for the pressure in one or more of the combustion chambers to be measured. The advantage of measuring the pressure in a combustion chamber here is that the heat released during a combustion process in the combustion chamber can be calculated, in order to improve subsequent combustion processes by altering injection parameters.

Since the injection conditions, for example the geometry of the injection nozzles, can change over the service life of the internal combustion engine, it is advantageous if the variation over time of the pressure in this combustion chamber is known for each of the combustion chambers, in order to optimize the combustion process individually. However, measuring the pressure in each of the combustion chambers, for example using a pressure sensor built in to the spark plug, has the disadvantage that it is cost-intensive, since a pressure sensor must be provided for each of the combustion chambers. A further disadvantage is that each of these pressure sensors must be connected to the engine control evaluating the pressure signals.

SUMMARY

A device and a method can be specified with which the pressure in a plurality of combustion chambers can be determined more simply or more cost-effectively.

According to an embodiment, an engine control for an internal combustion engine with a plurality of combustion chambers, may comprise—at least one pressure signal input to record at least one pressure signal which reproduces the combustion chamber pressure in one of the combustion chambers, and—an evaluation unit which determines the combustion chamber pressure in at least one other combustion chamber as a function of the pressure signal.

According to a further embodiment, the number of pressure signal inputs is smaller than the number of combustion chambers in the internal combustion engine. According to a further embodiment, the engine control further may comprise a pressure sensor which measures the combustion chamber pressure in the one combustion chamber and which may be connected to the pressure signal input to feed in the pressure signal. According to a further embodiment, the engine control may further comprise one or more pressure sensors which each measure the combustion chamber pressure in one of the combustion chambers and are each connected to one of the pressure signal inputs, the number of pressure sensors being smaller than the number of combustion chambers in the internal combustion engine. According to a further embodiment, the engine control may further comprise a speed signal input to record a speed signal which reproduces a rotational speed of the internal combustion engine, wherein the evaluation unit determines the combustion chamber pressure in the other combustion chamber as a function of the speed signal. According to a further embodiment, the engine control may further comprise a correction device which corrects the speed signal for changes which are brought about by oscillations in a drive train connected to the internal combustion engine. According to a further embodiment, the evaluation unit may be fitted in order to determine an interrelationship between the speed signal and the pressure signal, the evaluation unit determining the combustion chamber pressure in the at least one other combustion chamber as a function of the interrelationship. According to a further embodiment, the engine control may further comprise a memory connected to at least one of the following: the pressure signal input, the speed signal input, and the evaluation unit. According to a further embodiment, the evaluation unit may determine the combustion chamber pressure in the other combustion chamber as a function of at least one of the following: the stored pressure signal, the stored speed signal, and the stored interrelationship.

According to another embodiment, an internal combustion engine may comprise such an engine control.

According to yet another embodiment, a method may use such an engine control to determine a combustion chamber pressure.

According to yet another embodiment, a method for pressure determination of a combustion chamber pressure prevailing in a combustion chamber for an internal combustion engine having several combustion chambers, may comprise the steps of: —recording at least one pressure signal which reproduces the combustion chamber pressure in one of the combustion chambers, and—determining the combustion chamber pressure in at least one other combustion chamber as a function of the pressure signal.

According to a further embodiment, the number of pressure signals recorded may be smaller than the number of combustion chambers in the internal combustion engine. According to a further embodiment, the pressure signal may be determined by measuring the combustion chamber pressure in one of the combustion chambers. According to a further embodiment, the number of combustion chambers whose combustion chamber pressure is measured may be smaller than the number of combustion chambers in the internal combustion engine. According to a further embodiment, the method may further comprise the steps of—recording of a speed signal which reproduces the rotational speed of the internal combustion engine, and—determining the combustion chamber pressure in the other combustion chamber as a function of the speed signal. According to a further embodiment, the method may further comprise the steps of—determining of changes in the speed signal which are caused by an oscillation of a drive train connected to the internal combustion engine, and correcting the speed signal for the oscillation-determined changes. According to a further embodiment, the method may further comprise the steps of:—determining an interrelationship between the pressure signal and the speed signal and—determining of the combustion chamber pressure in the other combustion chamber as a function of the interrelationship. According to a further embodiment, the method may further comprise the step of: —storing the pressure signal, and/or—storing the speed signal, and/or storing the interrelationship. According to a further embodiment, the method may further comprise the steps of: —determining the combustion chamber pressure in the other combustion chamber as a function of the stored pressure signal, and/or—determining the combustion chamber pressure in the other combustion chamber as a function of the stored speed signal, and/or—determining the combustion chamber pressure in the other combustion chamber as a function of the interrelationship.

BRIEF DESCRIPTION OF THE DRAWINGS

The invention is explained in further detail below by way of the appended drawings, the drawings and the following description representing merely exemplary embodiments.

DETAILED DESCRIPTION

Figure 1:
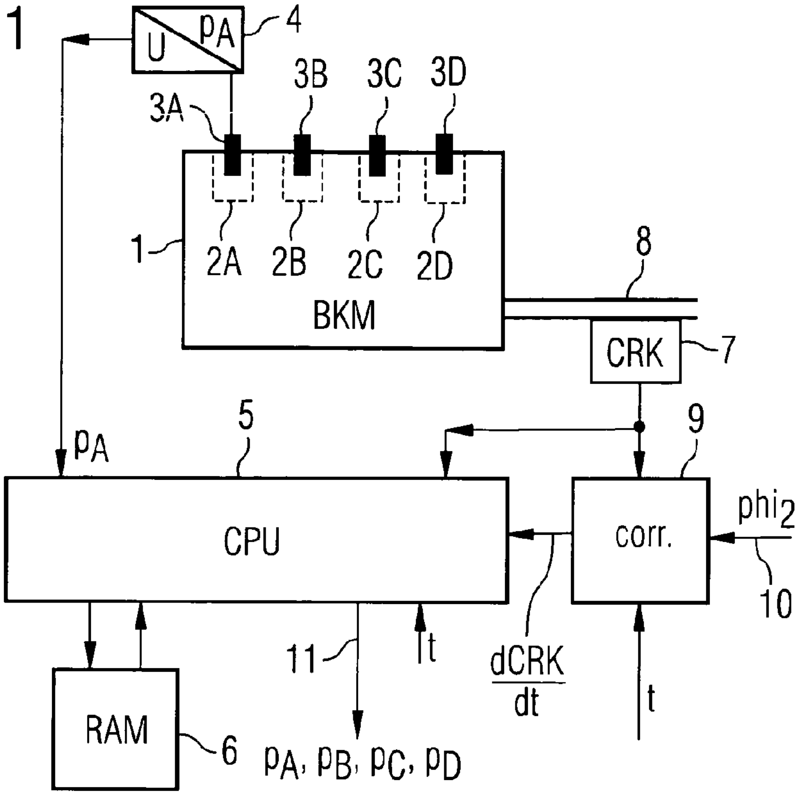
FIG. 1 shows an engine control for an internal combustion engine according to an embodiment.

The various embodiments are based on the knowledge that depending on the pressure signal that reproduces the combustion chamber pressure in one of the combustion chambers, the combustion chamber pressure in at least one other combustion chamber can be determined, for example by extrapolation. Thus the simplest assumption is that the combustion chamber pressure in the other combustion chamber is merely subject to a time lag compared to the combustion chamber pressure in the combustion chamber for which the pressure signal was determined. The time lag results from the time-lagged clock sequence of the combustion processes in the various combustion chambers of an internal combustion engine, for example a four-stroke internal combustion engine. In an internal combustion engine with a large number of cylinders, for example eight, ten or twelve, it is also possible for several combustion chambers to be clocked synchronously in respect of the combustion process, so that no time difference needs to be taken into account when determining the combustion chamber pressure in the other combustion chamber.

It can be especially advantageous if the combustion chamber pressure in the at least one other combustion chamber is determined as a function of the pressure signal and another parameter of the internal combustion engine. The other parameter can for example be a temperature, for example the oil temperature, measured at the internal combustion engine.

Preferably the engine control according to various embodiments may have at least one pressure signal input to record at least one pressure signal, the number of pressure signal inputs being smaller than the number of combustion chambers in the internal combustion engine. Especially preferred may be exactly one pressure signal input, where appropriate one pressure signal input per cylinder line. In this application, pressure signal input means an input actually located on the engine control, or also an existing line to route a pressure signal to the engine control. Thus for example it is also possible for the engine control to have a number of pressure signal inputs which is the same as or greater than the number of combustion chambers in the internal combustion engine, whereby however not all these pressure signal inputs physically present on the engine control are occupied. It is also conceivable that the pressure signal inputs are merely virtually present, for example if the engine control has a serial interface at which the pressure signal(s) are serially clocked and digitally fed in.

Advantageously the engine control may have a pressure sensor which measures the combustion chamber pressure in the one combustion chamber and which is connected to the pressure signal input to feed in the pressure signal. The pressure sensor can for example be a pressure sensor arranged in the spark plug which directly measures the combustion chamber pressure in the combustion chamber. A further possibility is that the pressure sensor indirectly measures the combustion chamber pressure in the combustion chamber, for example by measuring material deformations of the material surrounding the combustion chamber.

Preferably the engine control may have one or more pressure sensors, the number of pressure sensors being smaller than the number of combustion chambers in the internal combustion engine. Especially preferred may be exactly one pressure sensor, if appropriate one pressure sensor per cylinder line. This may have the particular advantage that fitting the internal combustion engine with pressure sensors is cost-effective, since not every combustion chamber needs to be fitted with a pressure sensor. However, according to an embodiment, it is also possible to fit all combustion chambers in the internal combustion engine with a pressure sensor and to use the various embodiments to record erroneous signals from one or more pressure sensors by means of a plausibility check.

According to the method the number of pressure signals recorded may be advantageously smaller than the number of combustion chambers in the internal combustion engine. Furthermore, the number of combustion chambers whose combustion chamber pressure is measured to determine the pressure signals can be preferably smaller than the number of combustion chambers in the internal combustion engine.

Advantageously a speed signal may be recorded according to an embodiment which reproduces a speed of the internal combustion engine. The speed can be preferably a rotational speed or an angle of rotation speed. The engine control advantageously may have a speed signal input for recording the speed signal. The evaluation unit of the internal combustion engine then determines the combustion chamber pressure in the other combustion chamber as a function of the speed signal and the pressure signal. It is possible to take account of further parameters of the internal combustion engine besides these two parameters. The speed signal can for example reproduce the angle of rotation speed of the crankshaft of the internal combustion engine. Taking account of the speed signal may be advantageous because as a result of a combustion process in one of the combustion chambers the crankshaft speed or another speed of the internal combustion engine is affected. Thus during combustion of a mixture in a combustion chamber the crankshaft is generally accelerated. According to an embodiment, it may be advantageous if a correlation between the speed signal and the pressure signal is derived, so that the combustion chamber pressure, i.e. also the pressure variation over time, can be inferred from a changing speed signal. Thus for example in the event of a sharp increase in the speed of the internal combustion engine it can be assumed that combustion at a high pressure has taken place which has resulted in a large force on the piston of the combustion chamber in question. It may be accordingly especially advantageous if a correlation is generated from the pressure signal of the one combustion chamber and the speed signal of the internal combustion engine, in order to infer a pressure variation in a combustion chamber in which a combustion process is taking place from a speed signal measured at another point in time.

Advantageously a correction device can be provided which corrects the speed signal for changes brought about as a result of oscillations of a drive train connected to the internal combustion engine. Thus it should be taken into account that the internal combustion engine is exposed to basic mechanical conditions by the drive train, which affect the speed of the internal combustion engine. Thus the increase in speed of the internal combustion engine is less if the internal combustion engine has to drive a load; in the general case assumed here this is the drive axle of the drive train of a motor vehicle mechanically linked to the base. Oscillations of the drive train are especially problematic as they can arise because of the elasticity of the drive train and thus can bring about an acceleration of the crankshaft speed of the internal combustion engine which is formed mechanically from the outside. In the context of modern engine controls it is possible to record the occurrence of such oscillations, for example in that the speed of the drive shaft of the internal combustion engine connected to the crankshaft is recorded, in that for example a time signal is generated every 0.5 degrees. By comparison of the time signals it is possible to record the speed of the crankshaft or of the drive shaft or of the drive train very accurately, so that these influences on the speed signal can be taken into account in order to correct the speed signal.

Advantageously an interrelationship or a correlation between the speed signal and the pressure signal can be determined, this interrelationship advantageously being stored. To this end, a memory may be advantageously provided, in which the pressure signal or the speed signal can be stored additionally or alternatively. When determining the interrelationship it can be especially advantageous if the interrelationship is determined over several combustion processes, so that measurement accuracies play a smaller role or a multidimensional characteristic field is generated, in which different pressure signal variations are saved for several different speed signal variations, these advantageously may be populated with parameters so that they can be adjusted to the measurement values.

Advantageously the combustion chamber pressure can be determined in the other combustion chamber as a function of the stored pressure signal or the stored speed signal or the stored interrelationship, i.e. if appropriate as a function of a stored characteristic field.

According to an embodiment, an internal combustion engine may have an advantageous engine control with the aforementioned features.

According to yet another embodiment, an engine control having the aforementioned features may be used to determine a combustion chamber pressure.

According to yet another embodiment, the pressure of a combustion chamber pressure prevailing in a combustion chamber can be determined.

FIG. 1 shows an internal combustion engine 1 with four combustion chambers 2A, 2B, 2C and 2D, each combustion chamber 2A, 2B, 2C and 2D having one spark plug 3A, 3B, 3C and 3D. The spark plug 3A of the combustion chamber 2A is fitted with a pressure sensor 4 which measures the combustion chamber pressure $p_A$ in the combustion chamber 2A. The pressure sensor 4 emits a pressure signal reproducing the combustion chamber pressure $p_A$ to an evaluation unit 5. The evaluation unit 5 is connected to a memory 6 in which the evaluation unit 5 can store and from there retrieve various characteristic figures and data, such as for example the combustion chamber pressure $p_A$ or a characteristic field.

The embodiment of the engine control in FIG. 1 furthermore includes an angle of rotation sensor 7 which determines the angle of rotation CRK of the crankshaft 8 of the internal combustion engine 1. In detail the angle of rotation sensor 7 emits a signal when the crankshaft 8 rotates by 0.5°. This signal is firstly made available directly to the evaluation unit 5 and is also fed into a correction unit 9. The correction unit 9 serves to remove oscillations present on the mechanical load side of the internal combustion engine 1 from the speed signal which is determined by the angle of rotation sensor 7 and which reproduces the angle of rotation speed of the crankshaft 8. To this end the correction unit 9 has another signal input 10, via which the correction unit 9 receives at least a further angular position of a further part of the drive train connected to the internal combustion engine 1 and the crankshaft 8. This can be advantageously the angular position of one or more driven wheels of a vehicle which is driven by the internal combustion engine 1. The correction of the signal emitted by the angle of rotation sensor 7 can also or additionally be performed by evaluating a torsion signal which reproduces the torsion of a part of the drive train. Thus advantageously the torsion of a part of the drive train or of the output-side part of the crankshaft 8 can be measured using a magnetostrictive sensor or a strain gauge. In this way it may be advantageously possible to calculate a notional load-independent speed variable of the internal combustion engine 1, which reproduces an increase in the angle of rotation speed of the crankshaft 8 which would be present in the absence of load. Furthermore the correction unit 9 and the evaluation unit 5 are supplied with a time signal t, in order to be able to calculate the aforementioned speeds and changes. The correction unit 9 sends a corrected angle of rotation speed dCRK/dt to the evaluation unit 5, this corrected angle of rotation speed preferably may be the above-mentioned notional increase in the angle of rotation speed of the internal combustion engine 1 in the absence of load.

The evaluation unit also has a signal output at which calculated combustion chamber pressures $p_A$, $p_B$, $p_C$ and $p_D$ are output for all combustion chambers 2A, 2B, 2C and 2D.

Figure 2A:
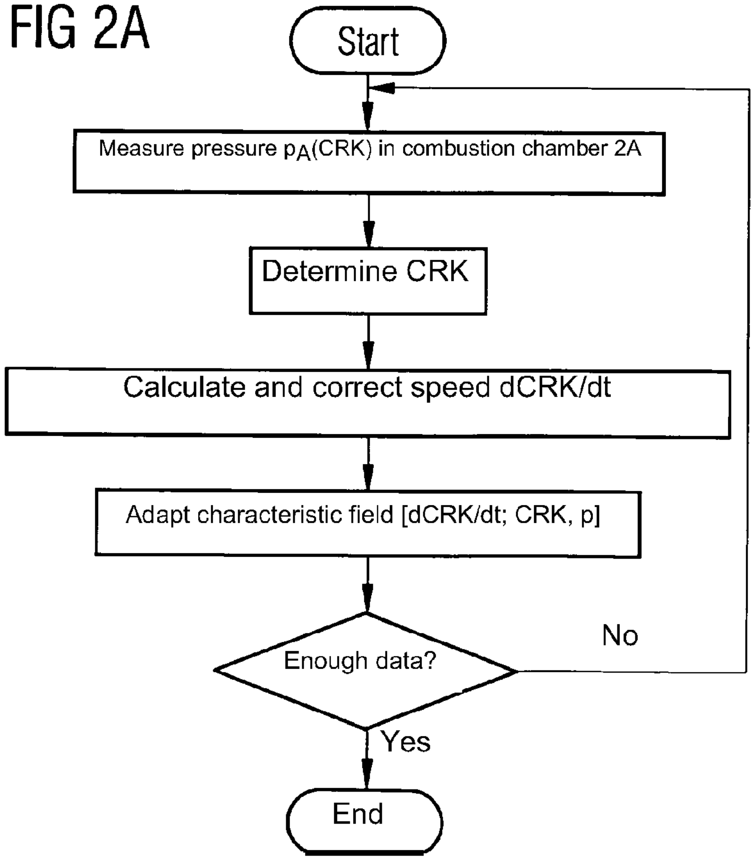
FIG. 2A shows an method for creating a characteristic field according to an embodiment.
Figure 2B:
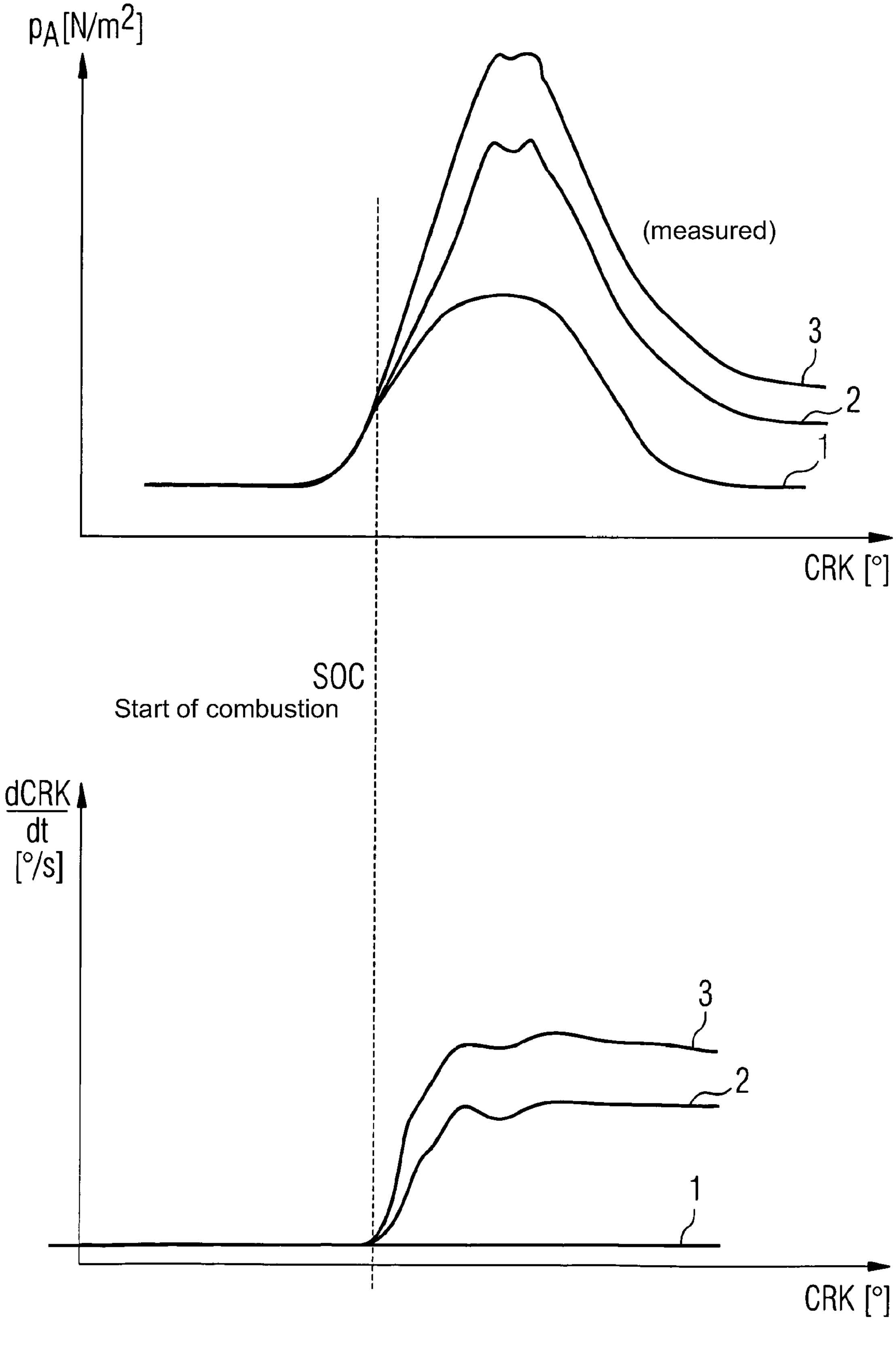
FIG. 2B shows diagrams of parameters of the internal combustion engine in conjunction with the method in FIG. 2A.

FIGS. 2A and 2B show a method and explanatory diagrams, it being possible to perform the method with the embodiment in FIG. 1. Hence in the description which now follows of FIGS. 2A and 2B, reference is made to the description in FIG. 1. The method in FIG. 2A serves to determine a characteristic field from which a pressure variation $p_A$, $p_B$, $p_C$ and PD for the combustion chambers 2A, 2B, 2C or 2D, in which precisely one combustion process takes place, can be taken for various angle of rotation speeds dCRK/dt and various angular positions CRK of the crankshaft 8 of the internal combustion engine 1. To determine this characteristic field a loop is repeatedly run through, the first step in this loop being that the combustion chamber pressure $p_A$ in the combustion chamber 2A is measured.

Subsequently the angle of rotation position CRK of the crankshaft 8 is determined and in turn the angle of rotation speed dCRK/dt of the crankshaft 8 is calculated from this variable and is corrected in the manner described above. The variables determined in this way are incorporated into the characteristic field, statistical methods being used to interpolate and smooth the characteristic field. Subsequently an interrogation takes place as to whether the characteristic field is sufficiently densely populated with data. If it is, the method ends. If not enough data for a sufficiently dense population of the characteristic field is present as yet, the method returns to the first step, in which in turn the combustion chamber pressure $p_A$ in the combustion chamber 2A is measured.

FIG. 2B shows various interrelationships between the angle of rotation speed dCRK/dt and the combustion chamber pressure $p_A$ measured in the combustion chamber 2A. The two diagrams shown in FIG. 2B contain the two aforementioned variables, each plotted against the crankshaft rotation angle CRK. In each case three curves are shown, which each represent a combustion cycle with (curves 2 and 3) and without (curve 1) combustion. In the case of curve 1 without combustion the angle of rotation speed dCRK/dt does not change. In contrast, when combustion takes place the angle of rotation speed dCRK/dt alters under the influence of the combustion, the change in this variable being accompanied by the combustion chamber pressure $p_A$ developing in the combustion chamber 2A. At a higher combustion chamber pressure $p_A$ the angle of rotation speed dCRK/dt is correspondingly more sharply changed, i.e. the crankshaft 8 is more sharply accelerated. In the aforementioned characteristic field different correlations between the combustion chamber pressure $p_A$ in the combustion chamber 2A and the increase in the angle of rotation speed dCRK/dt are stored for various angular positions CRK.

Figure 3A:
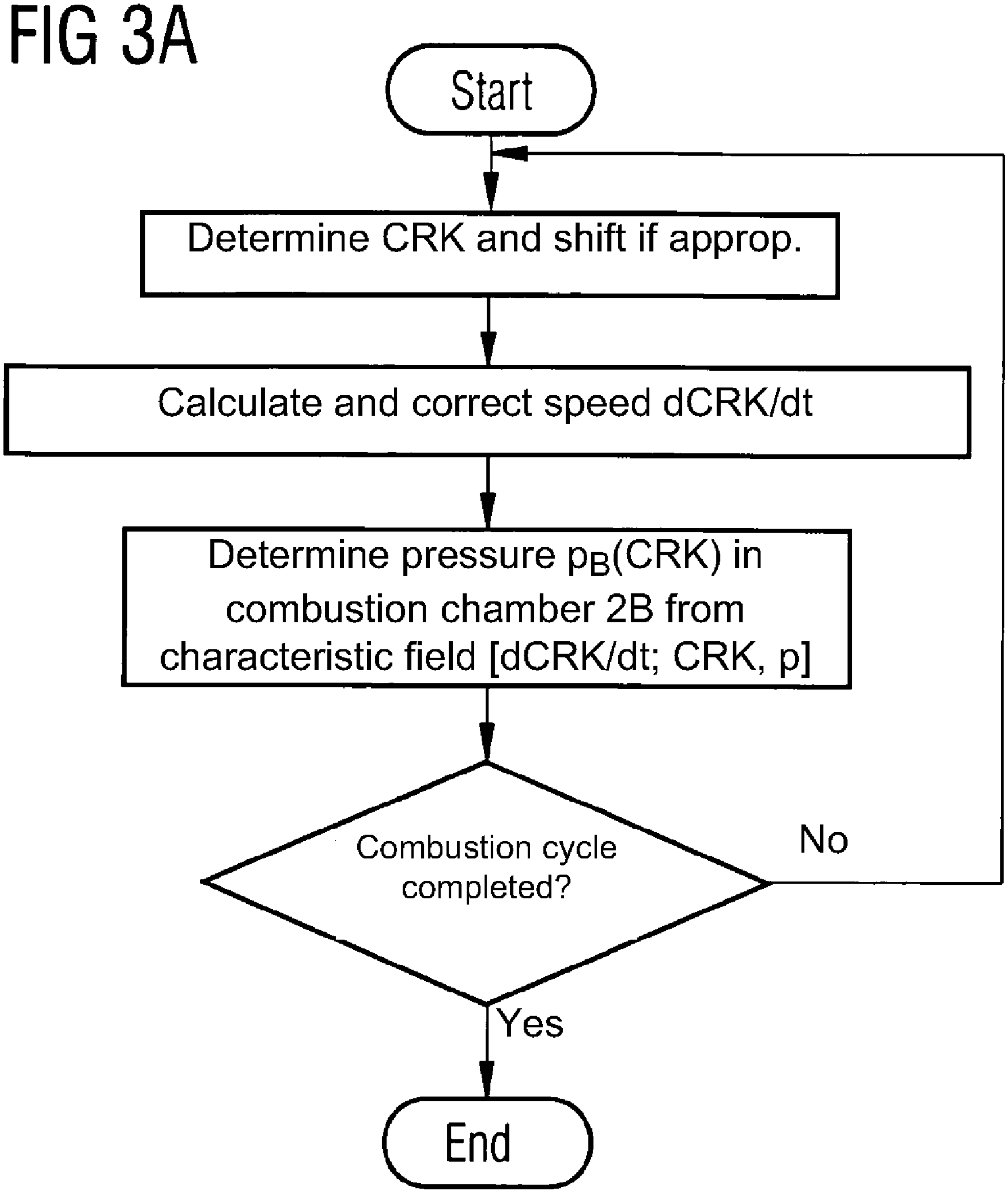
FIG. 3A shows a method for determining a combustion chamber pressure in another combustion chamber according to an embodiment.
Figure 3B:
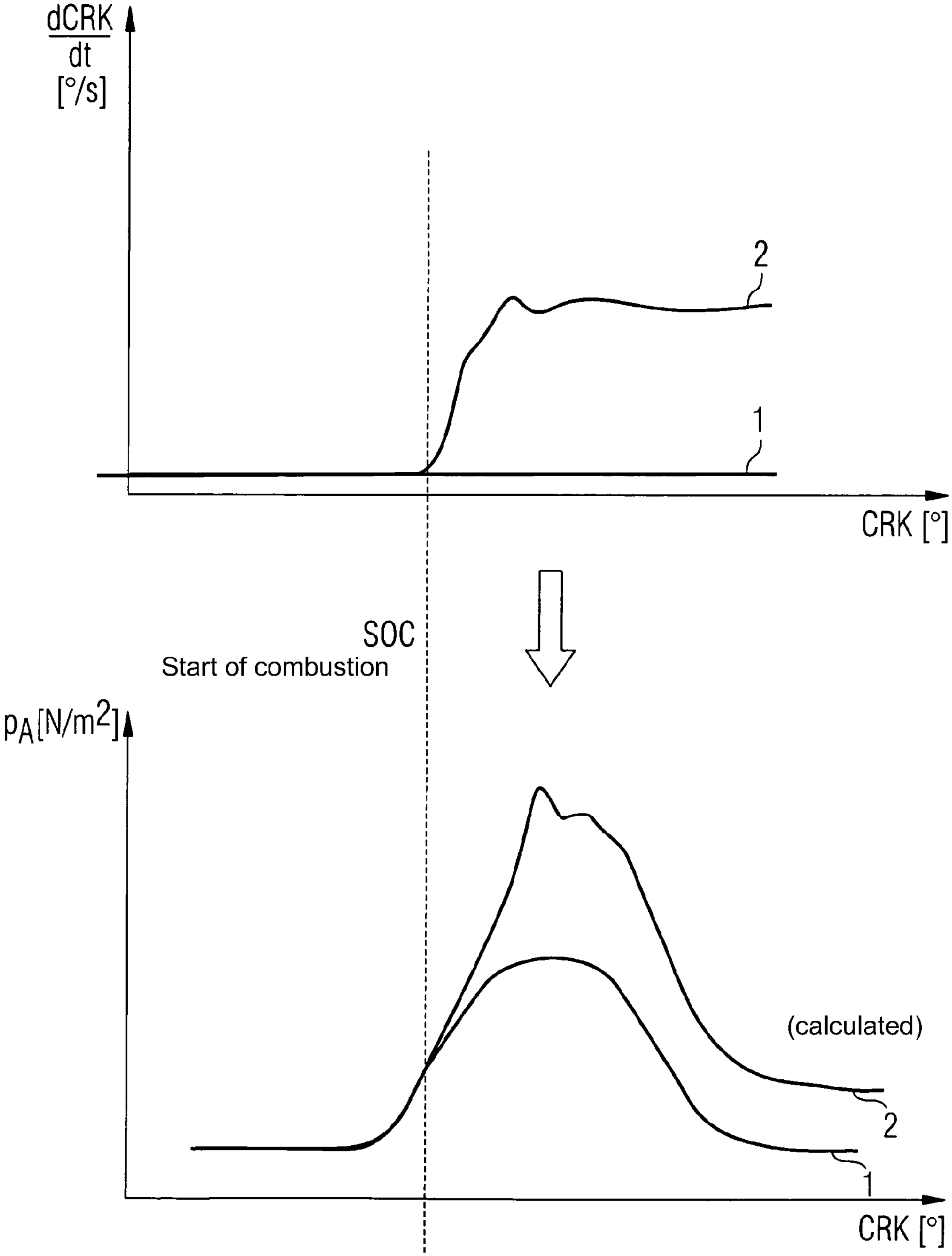
FIG. 3B shows diagrams with parameters in conjunction with the method in FIG. 3A.

FIGS. 3A and 3B show a method and diagrams used in the method. The method in FIG. 3A uses the characteristic field determined using the method in FIG. 2A to determine the combustion chamber pressure $p_B$, $p_C$ or $p_D$ in another of the combustion chambers 2B, 2C or 2D, here for example combustion chamber 2B. In the same way as shown here the combustion chamber pressure $p_C$ and $p_D$ in the combustion chambers 2C and 2D can also be determined. The method shown in FIG. 3A is suitable for use by the evaluation unit 5 shown in FIG. 1, so that reference is made to the description of FIG. 1 and to the description of FIGS. 2A and 2B.

Initially the angle of rotation CRK and the angle of rotation speed dCRK/dt is determined or calculated in the method in FIG. 3A, with which the pressure variation in the combustion chamber 2B is to be determined during a combustion process taking place there, the aforementioned speed being in turn corrected in the aforementioned manner. The angle of rotation CRK is shifted by a fixed angle, for example 180°, the angle by which the angle of rotation CRK is shifted depending on the cycle sequence of the internal combustion engine 1. This serves to standardize the combustion sequence under consideration in the combustion chamber 2B over time, i.e. in respect of the angle of rotation CRK. The shifted or standardized angle of rotation CRK and the angle of rotation speed dCRK/dt are used to determined the combustion chamber pressure $p_B$ in the combustion chamber 2B from the characteristic field determined using the method in FIG. 2A, the variables being interpolated in the characteristic field if no measurement value is available at the location in question. Subsequently an interrogation takes place to establish whether the combustion cycle in the combustion chamber 2B under consideration has been completed. If the combustion cycle has been completed, the method is ended and the pressure variation $p_B$ is output via the output 11 of the evaluation unit 5.

The invention is not restricted to the preferred exemplary embodiment described above. In particular, the methods shown can also be performed with internal combustion engines having more than four combustion chambers or having fewer than four combustion chambers, it also being conceivable that for example in the case of an internal combustion engine with ten or twelve combustion chambers with two cylinder lines each, exactly one combustion chamber of a cylinder line is provided with a pressure sensor. It is further possible that more combustion chambers of an internal combustion engine are also fitted with pressure sensors in order to improve the determination of the characteristic field. In addition, a plurality of variants and adaptations is possible, which likewise make use of the inventive idea and thus fall within the scope of protection.

The invention claimed is:

1. An engine control for an internal combustion engine with a plurality of combustion chambers, comprising:
- at least one pressure signal input to record at least one pressure signal which reproduces the combustion chamber pressure in one of the combustion chambers,
- a speed signal input to record a speed signal which reproduces a rotational speed of the internal combustion engine,
- an evaluation unit which determines the combustion chamber pressure in at least one other combustion chamber as a function of the pressure signal and the speed signal, and
- a correction device which corrects the speed signal for changes which are brought about by oscillations of a drive train connected to the internal combustion engine.

2. The engine control according to claim 1, wherein the number of pressure signal inputs is smaller than the number of combustion chambers in the internal combustion engine.

3. The engine control according to claim 1, comprising a pressure sensor which measures the combustion chamber pressure in the one combustion chamber and which is connected to the pressure signal input to feed in the pressure signal.

4. The engine control according to claim 1, comprising one or more pressure sensors which each measure the combustion chamber pressure in one of the combustion chambers and are each connected to one of the pressure signal inputs, the number of pressure sensors being smaller than the number of combustion chambers in the internal combustion engine.

5. The engine control according to claim 1, wherein the evaluation unit is fitted in order to determine an interrelationship between the speed signal and the pressure signal, the evaluation unit determining the combustion chamber pressure in the at least one other combustion chamber as a function of the interrelationship.

6. The engine control according to claim 1, comprising a memory connected to at least one of the following: the pressure signal input, the speed signal input, and the evaluation unit.

7. The engine control according to claim 6, wherein the evaluation unit determines the combustion chamber pressure in the other combustion chamber as a function of at least one of the following: the stored pressure signal, the stored speed signal, and the stored interrelationship.

8. An internal combustion engine comprising an engine control according to claim 1.

9. A method for pressure determination of a combustion chamber pressure prevailing in a combustion chamber for an internal combustion engine having several combustion chambers, the method comprising the steps of:
- recording at least one pressure signal which reproduces the combustion chamber pressure in one of the combustion chambers,
- recording of a speed signal which reproduces the rotational speed of the internal combustion engine, determining the combustion chamber pressure in at least one other combustion chamber as a function of the pressure signal and the speed signal, determining of changes in the speed signal which are caused by an oscillation of a drive train connected to the internal combustion engine, and correcting the speed signal for the oscillation-determined changes.

10. The method according to claim 9, wherein the number of pressure signals recorded is smaller than the number of combustion chambers in the internal combustion engine.

11. The method according to claim 9, wherein the pressure signal is determined by measuring the combustion chamber pressure in one of the combustion chambers.

12. The method according to claim 9, wherein the number of combustion chambers whose combustion chamber pressure is measured is smaller than the number of combustion chambers in the internal combustion engine.

13. The method according to claim 9, comprising determining an interrelationship between the pressure signal and the speed signal and determining of the combustion chamber pressure in the other combustion chamber as a function of the interrelationship.

14. The method according to claim 9, comprising at least one step selected from the group consisting of:

storing the pressure signal, storing the speed signal, and storing the interrelationship.

15. The method according to claim 14, comprising at least one step selected from the group consisting of:

determining the combustion chamber pressure in the other combustion chamber as a function of the stored pressure signal, determining the combustion chamber pressure in the other combustion chamber as a function of the stored speed signal, and determining the combustion chamber pressure in the other combustion chamber as a function of the interrelationship.

* * * * *